(12) United States Patent
Marble

(10) Patent No.: US 11,208,023 B2
(45) Date of Patent: Dec. 28, 2021

(54) TRAILER LOADING AND UNLOADING SYSTEM

(71) Applicant: Randall Boyd Marble, Tremonton, UT (US)

(72) Inventor: Randall Boyd Marble, Tremonton, UT (US)

( * ) Notice: Subject to any disclaimer, the term of this patent is extended or adjusted under 35 U.S.C. 154(b) by 32 days.

(21) Appl. No.: 15/935,765

(22) Filed: Mar. 26, 2018

(65) Prior Publication Data
US 2019/0291623 A1   Sep. 26, 2019

(51) Int. Cl.
| | |
|---|---|
| *B60P 1/36* | (2006.01) |
| *B60P 1/38* | (2006.01) |
| *B60P 1/16* | (2006.01) |
| *B60P 1/04* | (2006.01) |

(52) U.S. Cl.
CPC .......... *B60P 1/365* (2013.01); *B60P 1/04* (2013.01); *B60P 1/16* (2013.01); *B60P 1/38* (2013.01)

(58) Field of Classification Search
CPC ...... B60P 1/04; B60P 1/16; B60P 1/38; B60P 1/365
See application file for complete search history.

(56) References Cited

U.S. PATENT DOCUMENTS

| | | | | |
|---|---|---|---|---|
| 2,463,987 A | * | 3/1949 | Malone | B60P 1/14 298/1 B |
| 2,909,295 A | * | 10/1959 | Weir | B60P 1/006 414/515 |
| 3,164,410 A | * | 1/1965 | Robinson | B60P 1/38 298/1 B |
| 3,998,343 A | * | 12/1976 | Fors | B60P 1/006 414/501 |

(Continued)

*Primary Examiner* — Saul Rodriguez
*Assistant Examiner* — Ashley K Romano
(74) *Attorney, Agent, or Firm* — Strong & Hanni, P.C.; Joseph Shapiro

(57) ABSTRACT

A Trailer Loading/Unloading System may comprise a tilting flatbed trailer having one or more push bars configured to move along the surface of the trailer bed push palletized cargo off the trailer, move palletized cargo back and forth on the trailer, and prevent rapid descent or undesirable slipping of palletized cargo. Each of the push bars may be secured between a chain on the left side of the trailer bed and a chain on the right side of the trailer bed. These two chains may loop around a rear guide shaft at the rear of the trail and a front guide bar shaft at the front of the trailer. The guide shafts may be secured beneath the surface of the trailer, and may include sprockets around which the chains loop. A motor, e.g., a winch, may be secured to the trailer and may drive, using a sprocket and chain running around a shaft protruding from the motor, one of the guide shafts, e.g., the front shaft, by turning a sprocket mechanically secured to the front guide shaft. The Trailer Loading/Unloading System (Continued)

may further comprise a hydraulic lift actuator for raising the front of the trailer, thereby tilting the trailer. Palletized cargo may be unloaded from the trailer by raising the front of the trailer and thereby tilting the trailer, actuating the motor to push palletized cargo toward the rear of the trailer, and pulling the trailer forward when the edge of the palletized cargo is touching the ground.

4 Claims, 8 Drawing Sheets

(56) References Cited

U.S. PATENT DOCUMENTS

| | | | | | |
|---|---|---|---|---|---|
| 4,111,318 | A | * | 9/1978 | Lutz | B60P 1/006 198/817 |
| 4,261,682 | A | * | 4/1981 | Papps | B60P 1/38 198/813 |
| 4,518,303 | A | * | 5/1985 | Moser | B60P 1/38 198/750.1 |
| 4,685,856 | A | * | 8/1987 | Hesse, Jr. | B60P 1/006 198/746 |
| 4,747,747 | A | * | 5/1988 | Fusco | B60P 1/365 198/834 |
| 5,002,340 | A | * | 3/1991 | Loggins | B60P 1/006 298/1 B |
| 5,178,509 | A | * | 1/1993 | Webb | B60G 17/005 180/249 |
| 5,228,750 | A | * | 7/1993 | Hagenbuch | B60P 1/16 105/423 |
| 5,413,451 | A | * | 5/1995 | Pellegrino | B60P 1/365 198/851 |
| 5,456,520 | A | * | 10/1995 | Adams | B60P 1/16 105/281 |
| 5,456,521 | A | * | 10/1995 | Moyna | B60P 1/006 298/1 B |
| 5,466,112 | A | * | 11/1995 | Feller | B60P 1/16 239/657 |
| 5,902,090 | A | * | 5/1999 | Young | B60P 1/38 198/570 |
| 7,611,321 | B1 | * | 11/2009 | Cooper | B60P 1/6454 198/312 |
| 7,918,638 | B1 | * | 4/2011 | Loggins | B60P 1/283 298/1 B |
| 9,630,545 | B1 | * | 4/2017 | Corrigan | B60P 1/38 |
| 10,414,318 | B2 | * | 9/2019 | Valtanen | B60P 1/045 |
| 2003/0026679 | A1 | * | 2/2003 | Nijhof | B60P 1/365 414/528 |
| 2006/0245880 | A1 | * | 11/2006 | Priepke | A01D 85/005 414/501 |
| 2007/0000759 | A1 | * | 1/2007 | Knapen | B60P 1/365 198/527 |
| 2011/0002762 | A1 | * | 1/2011 | Horan | B60P 1/38 414/470 |
| 2011/0142585 | A1 | * | 6/2011 | Stewart | B60P 1/365 414/527 |
| 2012/0177467 | A1 | * | 7/2012 | Corrigan | B60P 1/38 414/352 |
| 2014/0003887 | A1 | * | 1/2014 | Thompson | A01D 90/083 414/24.5 |
| 2014/0003889 | A1 | * | 1/2014 | Van Bentzinger | G05D 1/02 414/111 |
| 2014/0151198 | A1 | * | 6/2014 | Wehner | B60P 1/38 198/834 |
| 2017/0057392 | A1 | * | 3/2017 | Killgour | B60P 1/30 |
| 2017/0129379 | A1 | * | 5/2017 | Boscher | B60P 1/365 |
| 2017/0291527 | A1 | * | 10/2017 | White | E21B 19/146 |
| 2017/0313230 | A1 | * | 11/2017 | Valtanen | B60P 1/045 |
| 2018/0104622 | A1 | * | 4/2018 | Dawson | B01D 21/10 |
| 2018/0147969 | A1 | * | 5/2018 | Richardson | B60P 1/38 |

* cited by examiner

TRAILER LOADING AND UNLOADING SYSTEM

BACKGROUND OF THE INVENTION

Transportation of cargo is important in many industries. Trucks and trailers are widely used for transporting cargo or loads. One of the difficulties in transporting loads is unloading the cargo. For many loads or cargo, special and/or heavy equipment is necessary to unload the cargo from the truck or trailer. However, unloading equipment is not always available at the delivery site. Unavailability of unloading equipment wastes time and may severely restrict the size, weight, or other features of cargo that may be transported on a particular truck/trailer setup. Alternatively, the need for unloading equipment that would not otherwise be available may require special efforts to make unloading equipment available at a delivery site, e.g., by hiring and scheduling unloading equipment, or by carrying unloading equipment on the truck/trailer setup that will be used for transportation. For example, a flatbed semi-trailer may be used to transport multiple pallets with heavy loads. The flatbed semi-trailer may be equipped to carry a forklift in addition to the pallets loaded with cargo. At a delivery site, the forklift is used to lift the pallets from the raised bed of the flatbed semi-trailer and then set the pallets on the ground.

Although it may make sense in some applications to carry a forklift, often it is not economical or is undesirable for other reasons. For example, often only a small number of pallets or other items must be transported. Although 1-4 pallets could be transported on a modestly sized trailer pulled by a pickup truck, the need for unloading equipment often results in the inefficient practice of using a huge flatbed semi-trailer to transport only 1-4 pallets—because a forklift for unloading must be transported to the delivery site in addition to the pallets. Also, it is often desirable to limit the size of a cargo transportation trailer when the delivery location may have weight, size, or movement restrictions. Again, the need for transporting a forklift or other unloading equipment may make such deliveries impossible and/or uneconomical, or may require delivery at a sub-optimal location, or may make the delivery operation unnecessarily difficult or time consuming.

Tilting trailers are known in the art. However, tilting trailers are often ineffective for palletized cargo for multiple reasons. First, the friction between the bottom of a loaded pallet and the surface of a trailer bed may be so great that it is difficult to tilt the trailer sufficiently to overcome the friction so that the pallet slides off the tilted trailer under the force of gravity. Second, using a traditional tilting trailer, once the trailer is tilted sufficiently-so that a pallet begins sliding—it is difficult or impossible to control the speed at which the pallets slides down the tilted trailer bed and onto the ground. Because of the angle of the tilted trailer relative to the ground, the distance between the lower end of the tilted trailer and the ground, and the characteristics of the loaded pallet (e.g., height, weight, shape, weight distribution, fragility), uncontrolled sliding of the loaded pallet, as well as the impact with the ground, is dangerous, may result in damage to the pallet or cargo on the pallet, and/or may result in tipping of the pallet. Also, with a traditional tilting trailer solution, it is impossible to move a pallet back toward the front of the trailer after it has slid or otherwise been moved toward the back of the trailer.

What is needed is an improved system and method for loading and unloading cargo, especially palletized cargo, onto a trailer or off a trailer.

BRIEF SUMMARY OF THE INVENTION

A system and method are disclosed for improved loading and unloading of cargo, especially palletized cargo, from a trailer. The system may be referred to herein as a "Trailer Loading/Unloading System."

In one embodiment, the Trailer Loading/Unloading System may comprise a tilting flatbed trailer having one or more push bars configured to push palletized cargo off the trailer and prevent rapid descent or undesireable slipping of palletized cargo.

A push bar may be secured between two chains, with one chain on each side of the trailer bed. The chains may loop by running above the trailer bed in one direction and below the trailer bed in the opposite direction. The chains may loop around a front chain guide shaft and a rear chain guide shaft. The front chain guide shaft and rear chain guide shaft may be secured to the underside of the trailer in a manner that allows the shafts to spin. The shafts may have sprockets around which the chains loop.

A push bar may be a two inch by two inch (2"×2") square steel tube, and may be secured between the two chains using adapter hardware. The trailer may further include a motor, which may be an adapted winch or drive motor, for driving the front chain guide shaft, and thereby moving a push bar along the top of the surface of the trailer's cargo bed.

The trailer may include a controller, e.g., a remote, for controlling the motor.

The trailer may further include an elevating system, e.g., a hydraulic lift actuator, disposed to elevate the front of the trailer, thereby tilting the trailer toward the rear.

The trailer may further include one or more ground extensions for fully or partially bridging the gap between the rear of the bed of the trailer and the ground when the trailer is in a tilted state.

The trailer may include more than one push bar, and may be configured for transporting, loading, and unloading of more than one pallet or cargo unit.

In one exemplary method, a trailer may be unloaded by (1) elevating the front of the trailer so that the trailer is in a tilted state, e.g., a 12-19 degree incline; (2) activating the motor to drive the push bar(s) toward the rear of the trailer, thereby pushing the palletized cargo toward the rear of the trailer; and (3) pulling the trailer forward when the palletized cargo is touching the ground.

The motor may be activated to turn in the opposite direction to move the push bar(s) toward the front of the trailer, thereby allowing for positioning of palletized cargo in either direction.

DETAILED DESCRIPTION OF THE INVENTION

Figure 1:
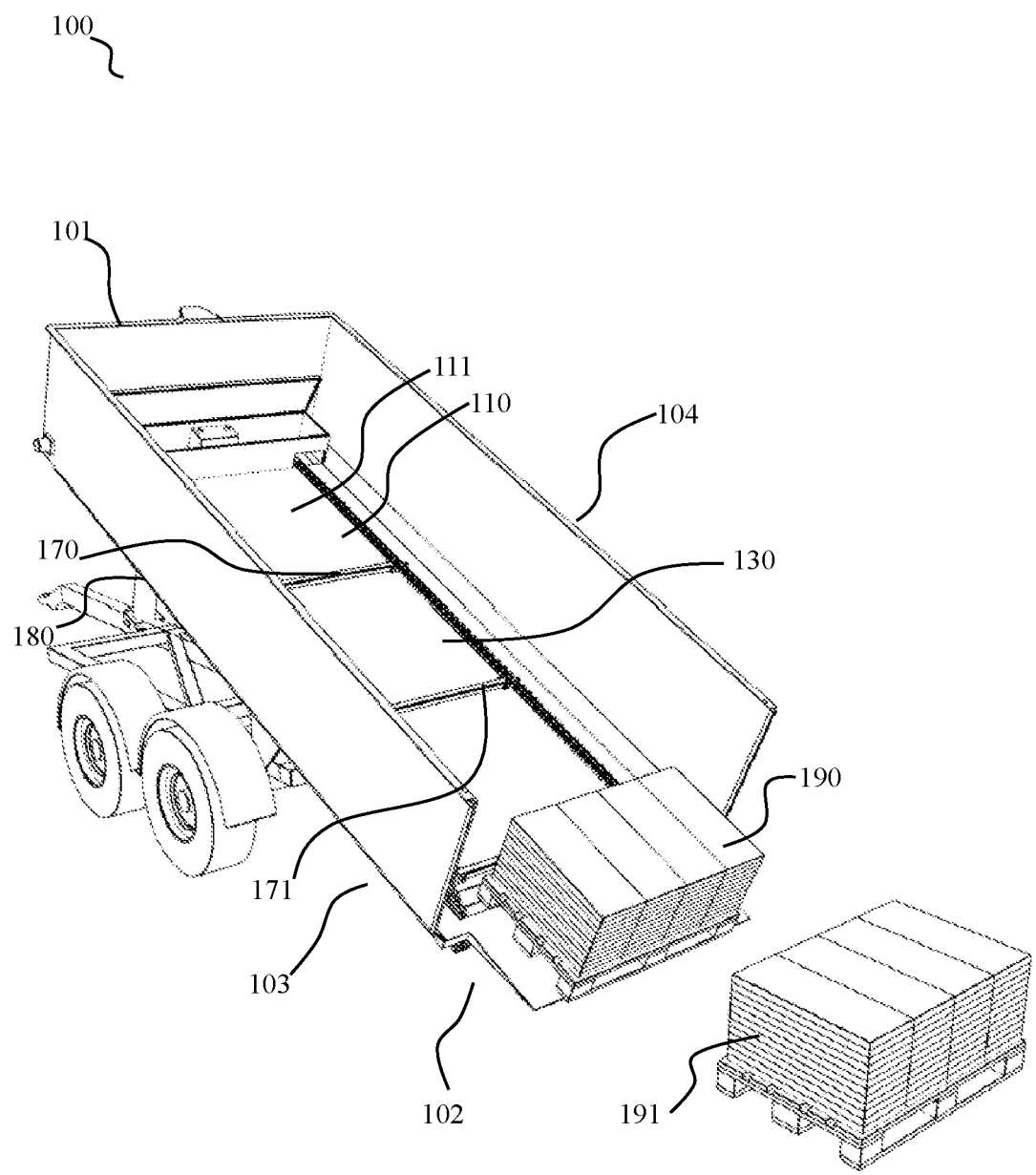
FIG. 1 shows the Trailer Loading/Unloading System in a tilted/elevated state.

A system and method are disclosed for loading and unloading cargo, including palletized cargo, onto and off a trailer.

In one embodiment, the disclosed Trailer Loading/Unloading System comprises a tilting flatbed trailer; two chain loops, one running along each side of the cargo hold of the trailer; a rear chain guide shaft secured to the underside of the rear end of the trailer bed; a front chain drive shaft secured to the underside of the front of the trailer bed; a chain drive motor configured to turn the front chain drive shaft; and at least one push bar secured between the two chain loops.

TABLE OF REFERENCE NUMBERS FROM DRAWINGS

The following table is for convenience only, and should not be construed to supersede any potentially inconsistent disclosure herein.

| Reference Number | Description |
| --- | --- |
| 100 | tilting flatbed trailer |
| 101 | front end of tilting flatbed trailer |
| 102 | rear end of tilting flatbed trailer |
| 103 | left side of tilting flatbed trailer |
| 104 | right side of tilting flatbed trailer |
| 106 | tongue of trailer |
| 110 | bed of tilting flatbed trailer |
| 111 | surface of bed of tilting flatbed trailer |
| 120 | left chain loop |
| 121a-n | links in left chain |
| 122 | chain link push bar adapter |
| 130 | right chain loop |
| 131a-n | links in right chain |
| 140 | rear chain guide shaft |
| 144 | left sprocket on rear chain guide shaft |
| 146 | right sprocket on rear chain guide shaft |
| 150 | front chain drive shaft |
| 154 | left sprocket on front chain drive shaft |
| 156 | right sprocket on right chain drive shaft |
| 158 | motor adapter sprocket |
| 160 | motor |
| 161 | motor drive chain |
| 162 | adapter for front chain drive shaft |
| 170 | push bar |
| 171 | push bar |
| 172 | push bar |
| 180 | jack/lift |
| 185 | left ground extension |
| 186 | right ground extension |
| 190 | loaded pallet |
| 191 | loaded pallet |
| 300 | flowchart for exemplary method of unloading |
| 310 | step in flowchart 300 |
| 320 | step in flowchart 300 |
| 330 | step in flowchart 300 |
| 340 | step in flowchart 300 |
| 350 | step in flowchart 300 |
| 360 | step in flowchart 300 |
| 370 | step in flowchart 300 |
| 380 | step in flowchart 300 |
| 390 | step in flowchart 300 |

Tilting flatbed trailer ("trailer") 100, as shown in FIGS. 1-3b, may be one of many heavy-duty flatbed trailers as are known in the art. The Trailer Loading/Unloading System described herein is an adaptation of a traditional tilting trailer 100.

In one embodiment, trailer bed 110 may have a width of 72 inches and a length of 132 inches. For reference, one common pallet size is 40 inches wide×48 inches long. A trailer bed 100 with these dimensions is large enough, according to one embodiment of the Trailer Loading/Unloading System disclosed herein, to transport two standard 40 inch×48 inch (40"×48") pallets. Other embodiments may include trailers that are large enough at least for three or four pallets.

Although surface 111 of trailer bed 110 may be many materials (e.g., wood, steel, other metal, metal composites, or other materials known in the art), in one embodiment, surface 111 may be three sixteenths inch (3/16") steel sheet to decrease friction and promote sliding of pallets. Depending on characteristics of a particular application, different materials may be used for surface 111. Factors may include desired slipperiness/friction characteristics, durability, smoothness, cost, color, performance when wet, or other factors.

In one embodiment, surface 111 of trailer bed 110 may be smooth. Depending on characteristics of a particular application, surface 111 may have grooves running the length (i.e., front to back) of trailer 110, or may be corrugated, or may have other features.

Figure 3A:
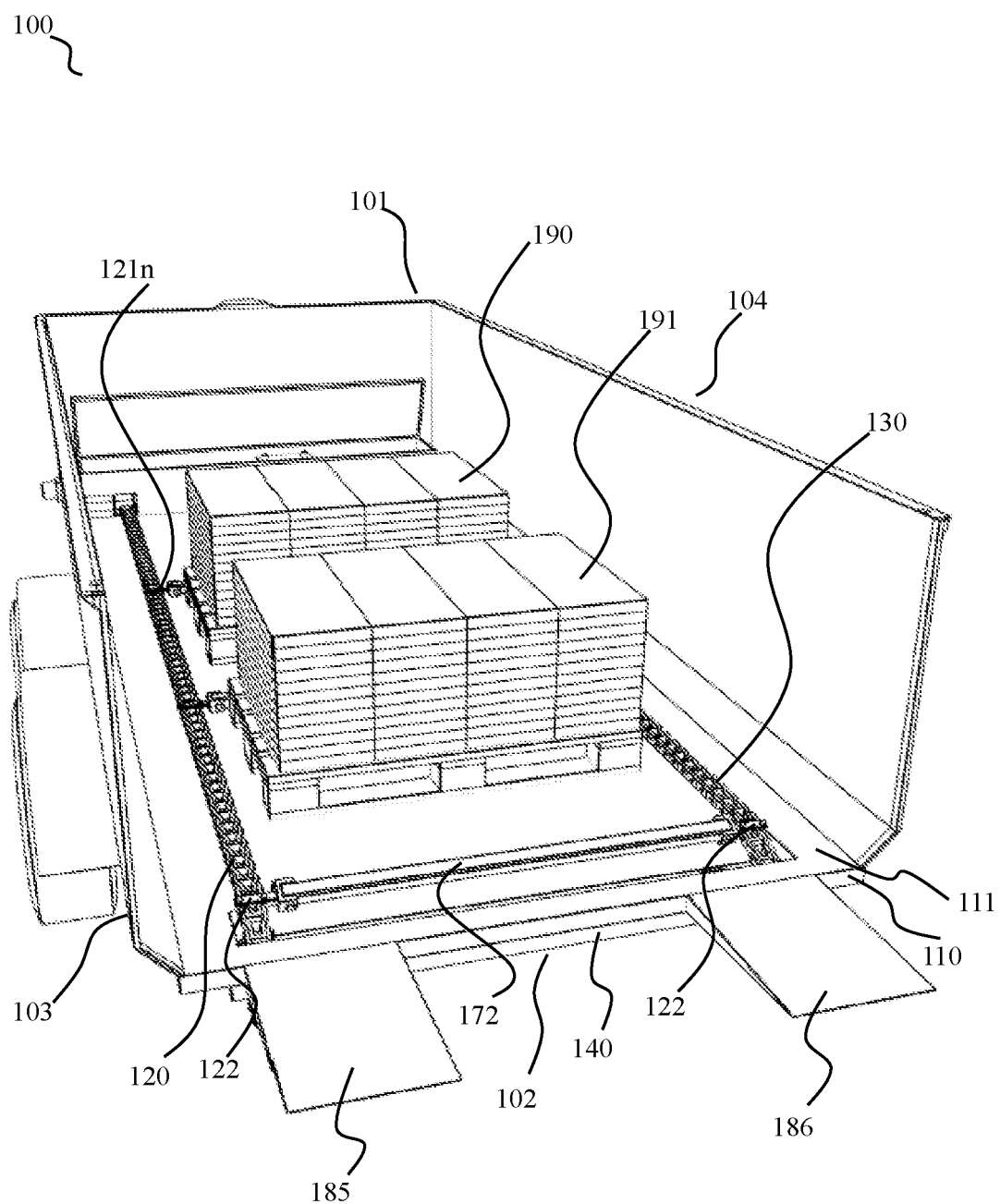
FIG. 3*a* shows the Trailer Loading/Unloading System from the rear, in a tilted/elevated state, with left ground extension and right ground extension installed.
Figure 3B:
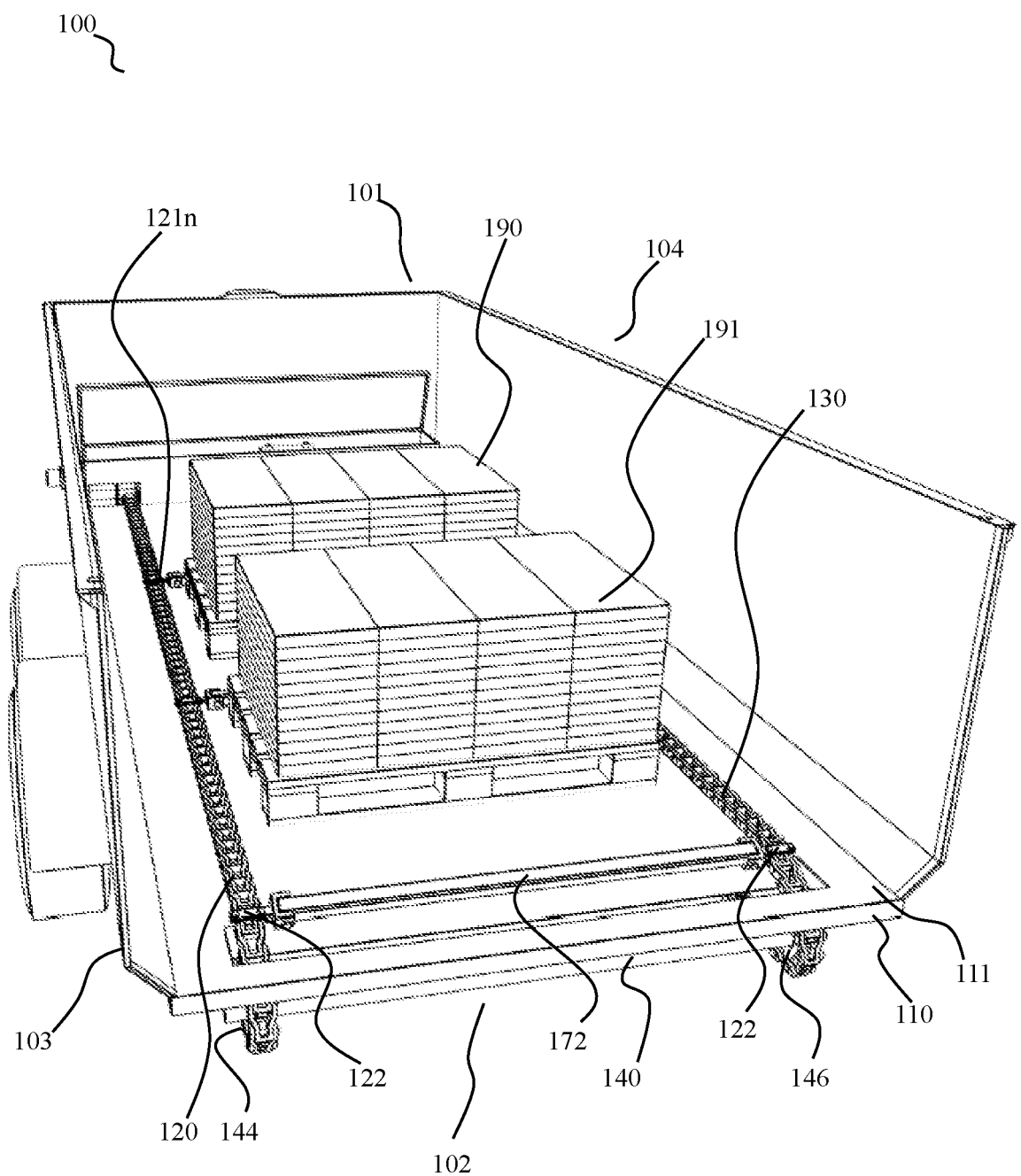
FIG. 3*b* shows the Trailer Loading/Unloading System from the rear, in a tilted/elevated state, without ground extensions.

As shown in FIGS. 3a and 3b, Rear chain guide shaft 140 may be secured to the underside and/or outside of trailer 110 at or near the rear of trailer 110. Rear chain guide shaft 140 may be secured to underside and/or of trailer 110 using a left spinning adapter and a right spinning adapter. Such spinning adapters are known in the art, and may include flange bearings or other well-known solutions for spinning or rotation.

Figure 2:
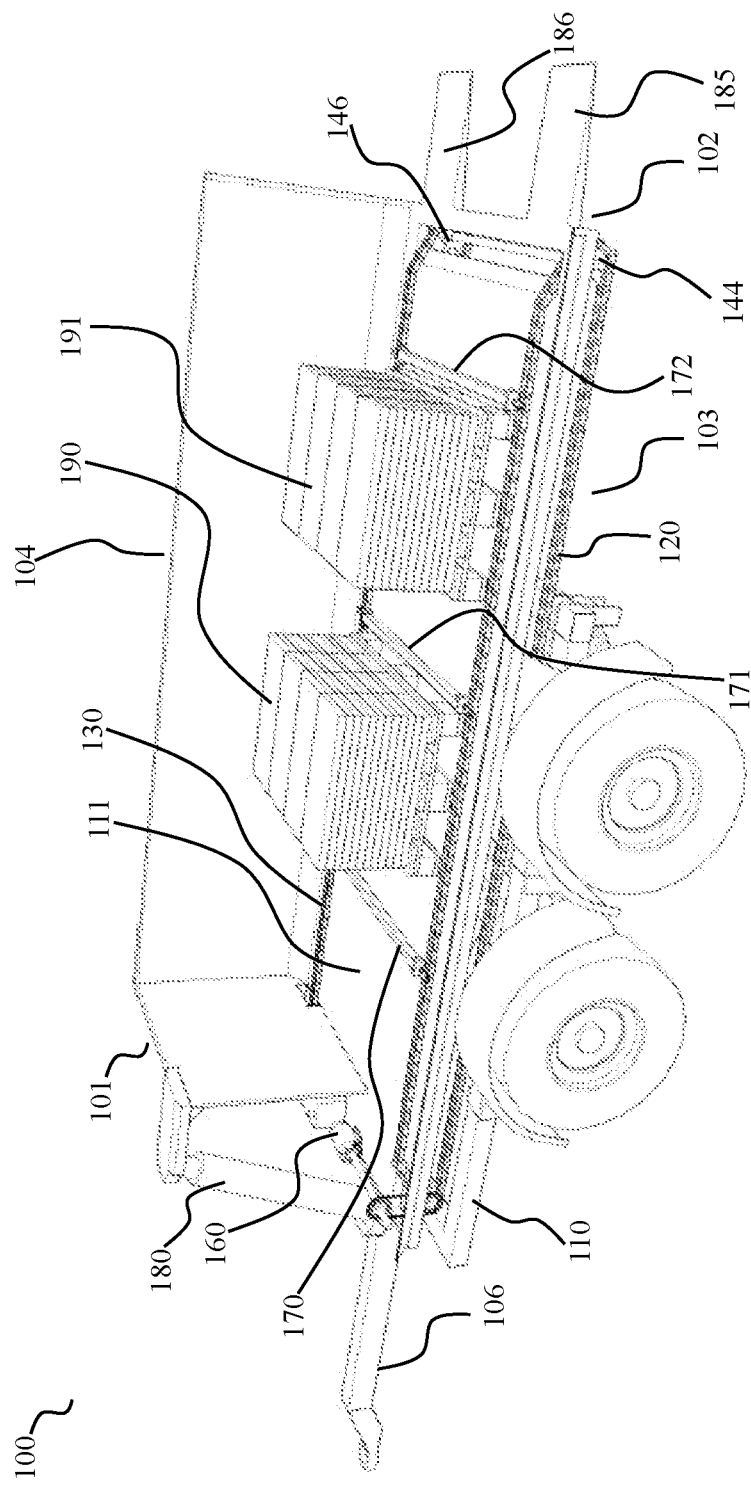
FIG. 2 shows the Trailer Loading/Unloading System in a flat state, with the left wall of the trailer omitted for convenience in showing features of the Trailer Loading/Unloading System.

As shown in FIGS. 2 and 3b, each end of rear chain guide shaft 140 may include a sprocket for guiding the two chains 120 and 130. Left end of shaft 140 may include left sprocket 144, and right end of shaft 140 may include right sprocket 146. Sprockets 120 and 130 may be monolithic parts of shaft 140, e.g., by welding sprockets 144 and 146 onto shaft 140, or may be mechanically secured to shaft 140, or may be secured with set screws and keyways, or may be secured in any other manner known in the art.

Sprockets are designed to be complementary to chains 120 and 130. For example, sprockets 144 and 146 may comprise teeth sized to fit in the voids in the links of chains 120 and 130. In one embodiment, sprockets 144 and 146 may each a tooth cross section length of to fit the voids in the links of chains 120 and 130.

The distance between left sprocket 144 and right sprocket 146 may be 56 inches, which is the width of a standard pallet (48 inches) plus an extra four inches on each side of the pallet as working space.

Figure 4:
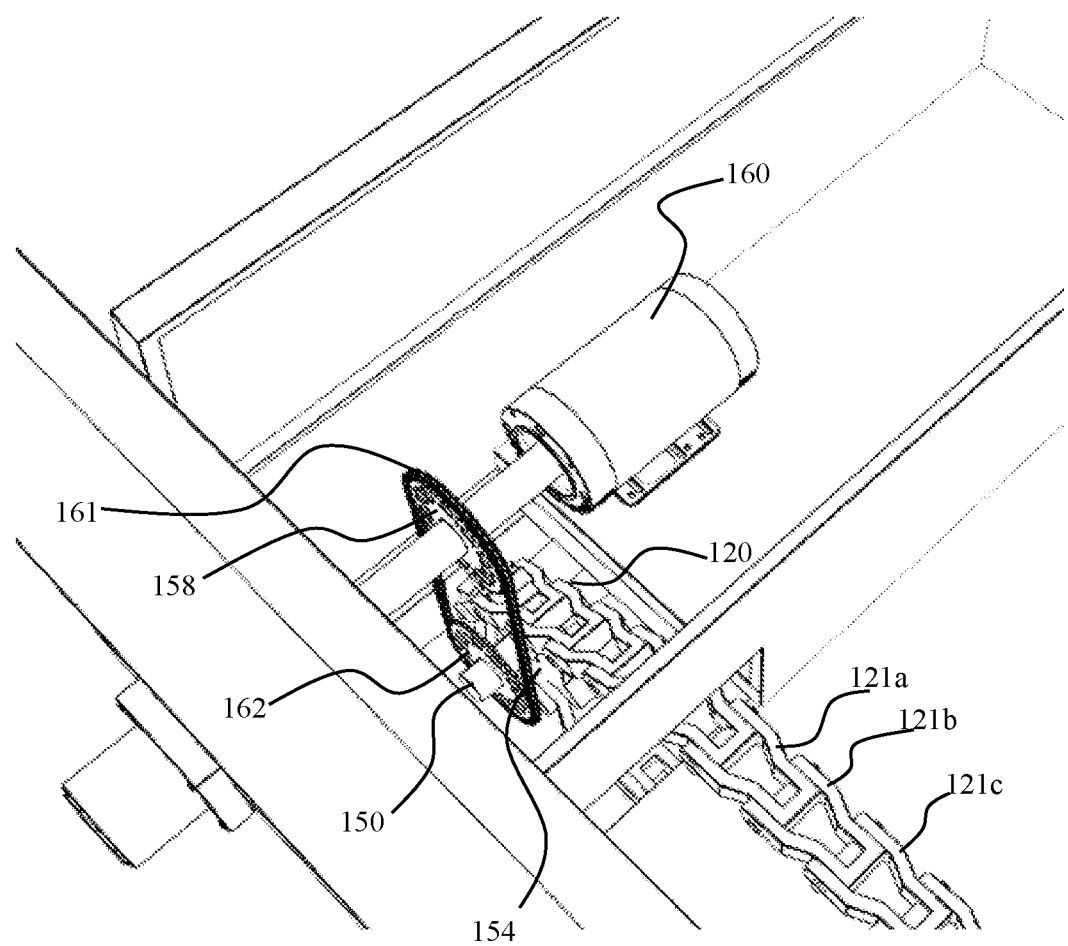
FIG. 4 shows an elevated closeup of the motor and chain drive system in the Trailer Loading/Unloading System.

As shown in FIGS. 2 and 4, front chain drive shaft 150 may be secured to the underside of trailer 110 at or near the front 101 of trailer 110. Shaft 150 may be secured to trailer 110 similarly to the manner for securing rear chain guide shaft to trailer 110, i.e., in a manner that allows for front chain drive shaft 150 to spin.

Figure 5:
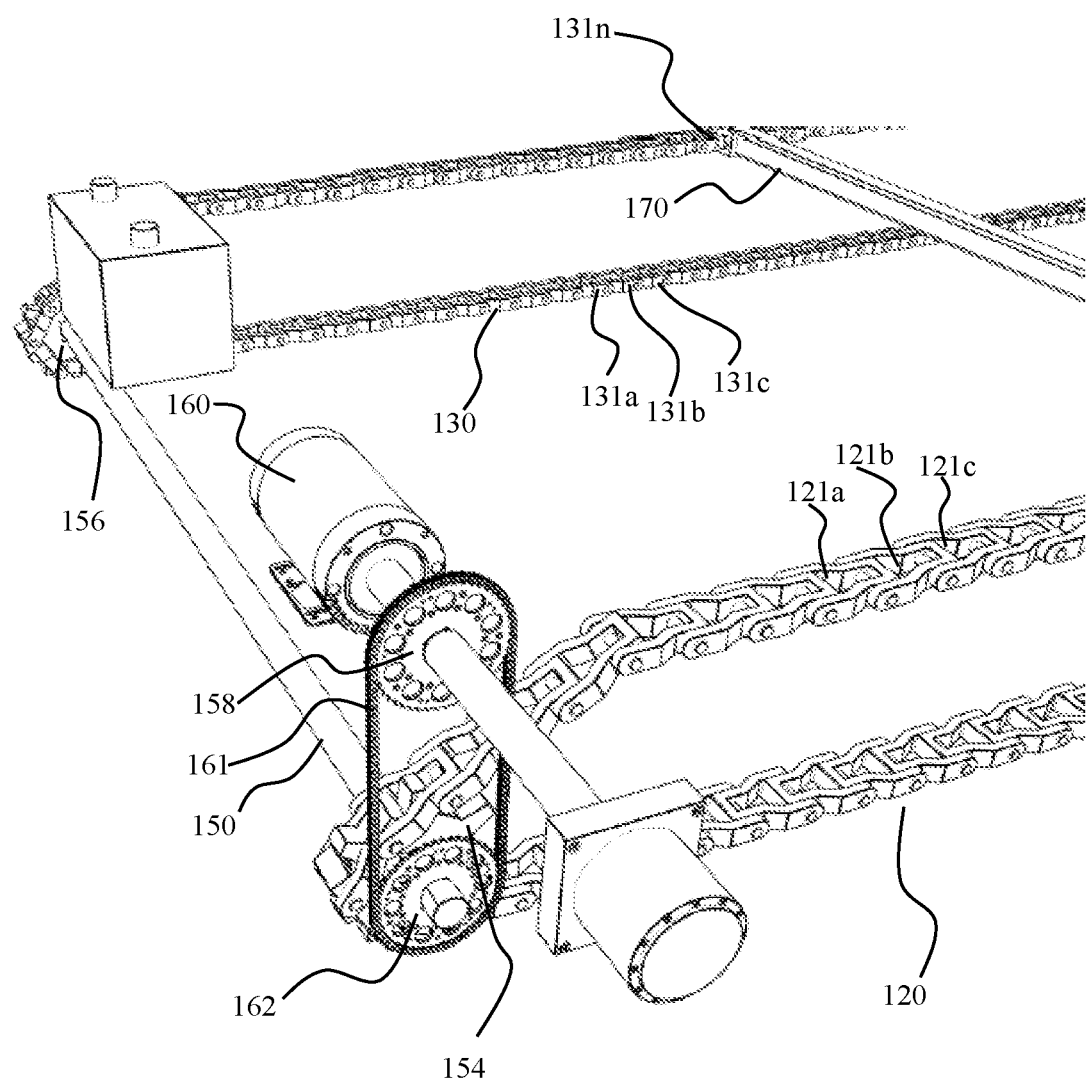
FIG. 5 shows an elevated perspective view of a closeup of the motor and chain drive system in the Trailer Loading/Unloading System. The cargo bed and some other components are omitted for convenience in emphasizing particular features of the Trailer Loading/Unloading System.

As shown in FIGS. 4 and 5, front chain drive shaft 150 may include sprockets 154 and 156, configured as sprockets 144 and 146 are configured on rear chain guide shaft 140. Except for motor adapter cog 158, front chain drive shaft 150 may be identical to rear chain guide shaft 140.

Front chain drive shaft 150 may include motor adapter sprocket 158. As shown in FIGS. 4 and 5, sprocket 158 may be disposed on front chain drive shaft 150 to the outside of, i.e., to the left of, left sprocket 154. Sprocket 158 may be a monolithic part of shaft 150, e.g., by welding sprockets sprocket 158 onto shaft 158, or may be mechanically secured to shaft 150, e.g., by fastening with set screws and keyways, or may be secured in another manner.

The teeth on motor adapter sprocket 158 are complementary to motor drive chain 161, which is driven by motor 160.

Motor 160 may be any kind of motor or other powered device known in the art for driving a chain. In one embodiment, motor 160 may be a winch including an adapter 162 for driving chain 161, which in turn drives motor adapter sprocket 158, including front chain drive shaft 150.

Motor 160 may be controlled by one of many control interfaces known in the art. In one embodiment, motor 160 may be controlled by motor control 163, which may be a dual signal handheld remote control.

As shown in FIG. 4, motor 160 may be secured to front 101 of trailer 100, and may be powered by a battery, or electric over hydraulic, or in any means known in the art for powering a motor.

As shown in FIGS. 2-5, left chain loop 120 loops around left rear sprocket 144 and left front sprocket 154. As also shown in FIGS. 2-5, right chain loop 130 loops around right rear sprocket 146 and right front sprocket 156.

Figure 6:
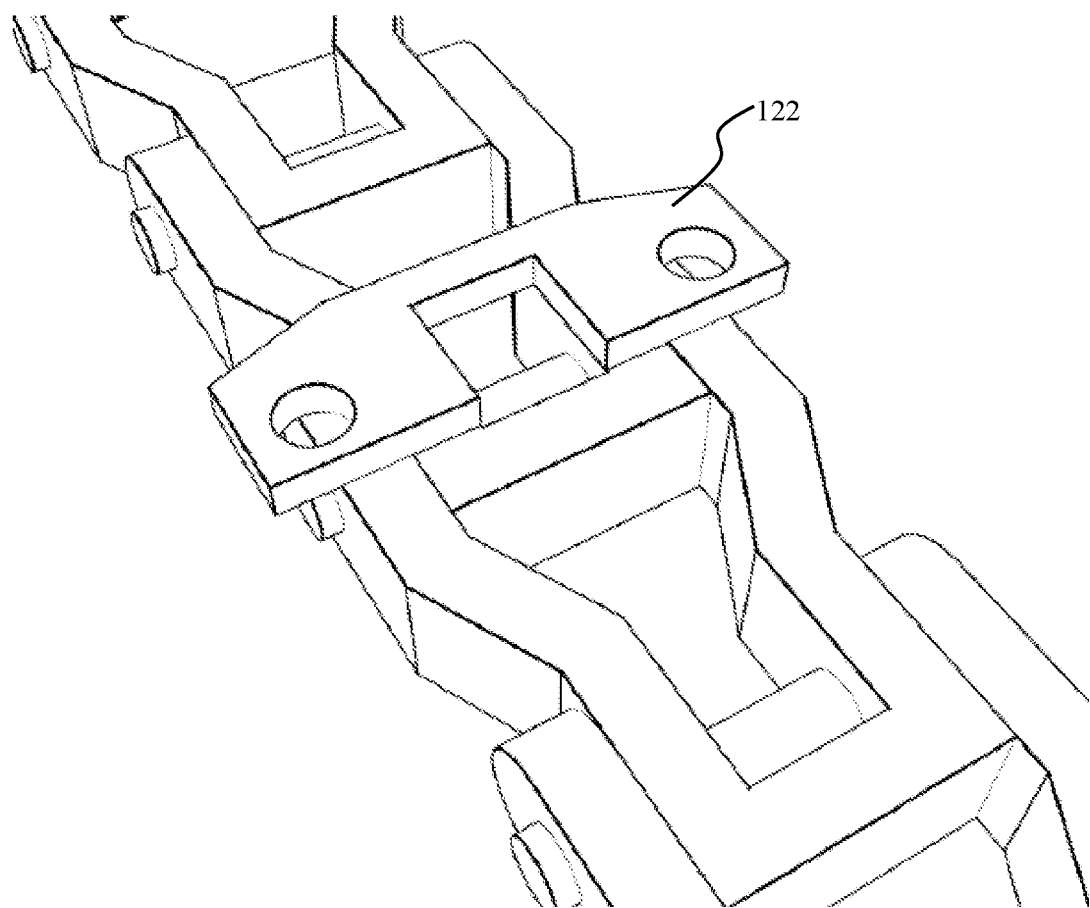
FIG. 6 shows a close-up view of a left chain loop or right chain loop, along with a push bar adapter.

As shown in FIGS. 3a, 3b, and 5, push bar 170 is secured between corresponding links 121n and 131n in left chain 120 and right chain 130, respectively. Push bar 170 may be a hollow rectangular prism made of steel or any other substantially rigid and strong material. For example, push bar 170 may have a two inch by two inch (2"×2") cross section, and may be made of three sixteenths inch (3/16") steel. The length of push bar 170 may be approximately the distance between left chain 120 and right chain 130. As shown in FIGS. 3a, 3b, and 6, push bar 170 (or push bars 171 and 172) may be mechanically secured to links 121n and 131n using link push bar adapters 122. Push bar 170 may be secured to links 121n and 131n other ways, e.g., using different adapters, or welding, or hardware that does not require adapters.

In some embodiments, more than one push bar may be secured between chains 120 and 130. For example, for a trailer 100 that is large enough for two pallets, two push bars may be secured between different sets of corresponding links in chains 120 and 130. Using more than one push bar may allow pallets to be pushed independently, i.e., without the pallets pushing each other. Also, if push bars are installed such that a push bar is both in front of and behind a pallet, then the pallet may be both pushed toward rear 102 of trailer 100 and toward front 101 of trailer 100. This is useful for several reasons. For example, if trailer 100 is carrying two pallets, then a first pallet, e.g., the pallet closest to rear 102 of trailer 100, may be unloaded by activating motor 160 to move chains 120 and 130 and secured push bars toward rear 102 of trailer 100. When the first pallet has been unloaded, motor 160 may be activated in the opposite direction, i.e., to move chains 120 and 130 and secured push bars toward front 101 of trailer 100. This may allow for balancing the trailer when it is carrying only one loaded pallet instead of two.

Trailer 100 may also include jack 180. As shown in FIGS. 1 and 2, jack 180 may be mounted and/or secured at or near front 101 of trailer 180. As is well known in the art, jack 180 may be powered and configured to raise the front of trailer 100, thereby tilting trailer 100 so that bed 110 of trailer 100 is slanted downward from front 101 to rear 102. In one embodiment, jack 180 may be a hydraulic lift actuator.

In one embodiment, jack 180 and motor 160 may be powered by one or more batteries secured to trailer 100. For example, two vehicle batteries may be secured to trailer 100 to provide power to jack 180 and motor 160. In one embodiment, these batteries may be charged primarily by the power system of the truck or other vehicle that is attached to trailer 100 for pulling and otherwise moving trailer 100. Trailer 100 may include a battery charger, which may also be connected to a power system for a vehicle. Turning on the battery charger periodically, e.g., once a week, to top of the batteries may prolong battery life. As will be appreciated by a person of ordinary skill in the art, many alternative power systems or variations on power systems could be employed for powering jack 180 and motor 160.

In one embodiment, trailer 100 may include a control for controlling jack 180 and/or motor 160. The control may be a hand-held dual signal radio remote control configured to control both jack 180 and motor 160. Using a hand-held radio remote control avoids inconvenience, unwieldiness, and interference that may result from using a control that connects to the jack 180 and/or motor 170 using a cable, cord, or wire. Because trailer 100 has moving parts, it may be dangerous and/or inconvenient to control such moving parts with a control that is connected via a cable, cord or wire. Further, having a remote control with an interface and controls for both jack 180 and motor 160 may increase convenience and efficiency for several reasons. First, it is generally easier to manipulate one control than two separate controls. Second, with an interface and controls for both jack 180 and motor 160 on the same remote, it may be easier to operate both jack 180 and motor 160 simultaneously. This may be desirable to increase efficiency by activating motor 160 to push palletized cargo toward the rear of trailer 100 while jack 180 is raising/tilting trailer 100.

In one embodiment, as shown in FIGS. 2 and 3a, trailer 100 may include left ground extension 185 and right ground extension 186. Extensions 185 and 186 may be removeable or may be permanent. Extensions 185 and 186 may be secured to rear 102 of trailer 100 by welding, mechanical means, or using other approaches for securing parts. In one embodiment, extensions 185 and 186 may be made of steel. Extensions 185 and 186 extend trailer bed 110 so that it is closer to the ground or touching the ground when trailer bed 110 is in a tilted state. Decreasing the distance to the ground decreases the likelihood of damage to a pallet or its cargo during unloading, and also decreases the likelihood that a pallet will tip during unloading.

In one embodiment, bed 110 of tilting trailer 100 may be secured to a pivot point at the rear of the rear axle of tilting trailer 100. Securing bed 110 at the rear of the rear axle may mitigate or avoid obstruction by the rear axle when bed 110 tilts toward the rear as described herein.

Using the Trailer Loading/Unloading System as disclosed herein, pallets and other loads may be conveniently unloaded from trailer 100.

Figure 7:
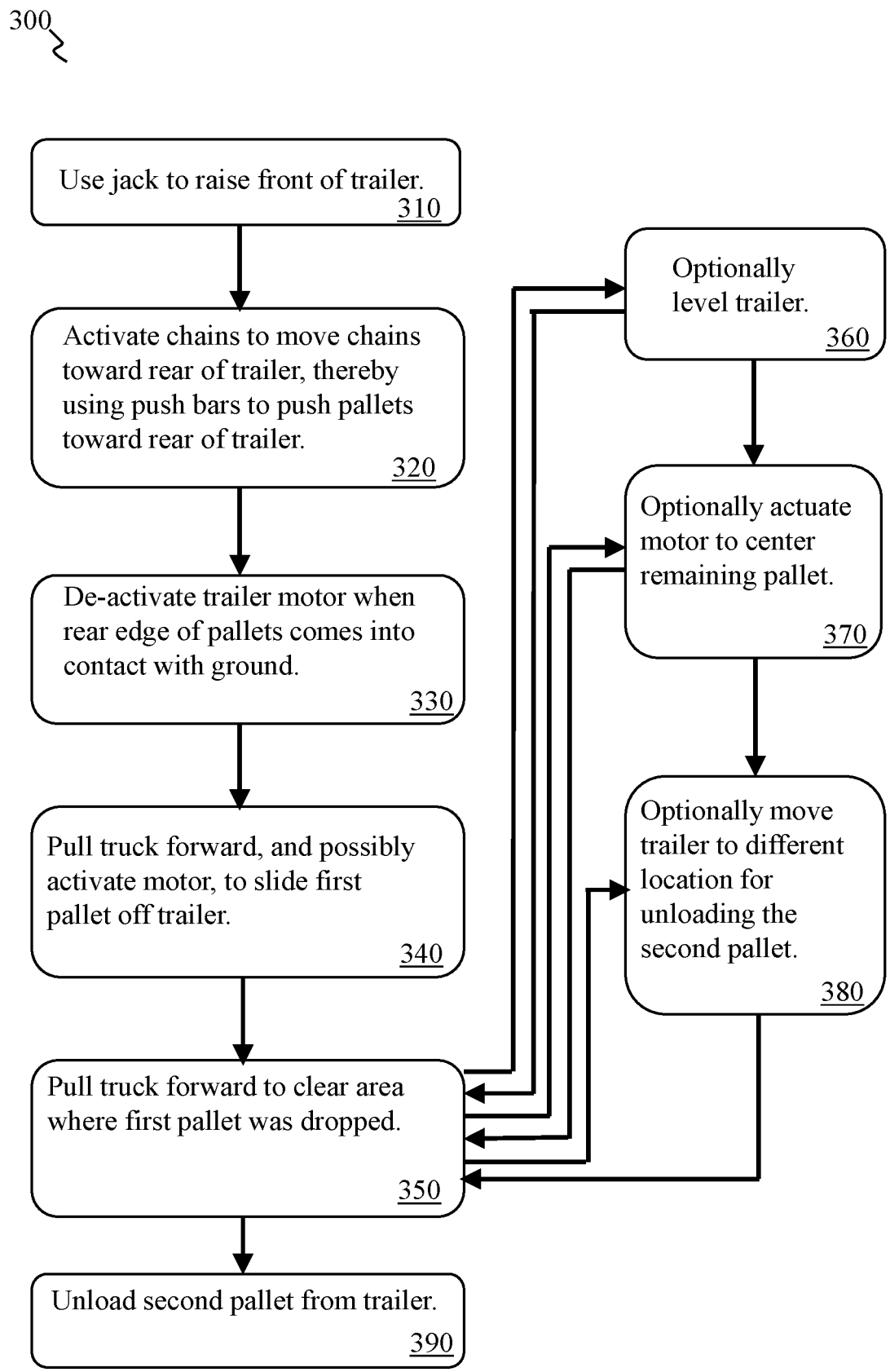
FIG. 7 shows a flowchart for an exemplary method as disclosed herein.

In one exemplary unloading method, as shown in flowchart 300 in FIG. 7, trailer 100 may begin as shown in FIG. 2: attached to a hitch on a truck, loaded with two pallets 190 and 191. Pallet 190 is nearest to front 101 of trailer 100. Pallet 191 is nearest to rear 101 of trailer 100. As shown in FIGS. 1-3b, trailer 100 may be configured with three push bars 170, 171, and 172. Push bar 170 is located to the front of pallet 190. Push bar 171 is located between pallet 190 and pallet 191. Push bar 172 is located to the rear of pallet 191.

At step 310, a user may use jack 180 to push front 101 of trailer 100 upward from tongue 106 such that trailer bed 110 is tilted downward toward rear 102 of trailer 100.

At step 320, a user may activate motor 160 to move chains 120 and 130, as these chains run above trailer bed 110, toward rear 102 of trailer bed 110. As chains 120 and 130 move toward rear 102 of trailer bed 110, push bars 170, 171, and 172 also move toward rear 102 of trailer bed 110. As push bars 170 and 171 move toward rear 102 of trailer bed 100, they engage pallets 190 and 191, pushing them toward rear 102 of trailer bed 110.

At step 330, a user may de-activate motor 160 when rear edge of pallet 191 comes into contact with the ground 195.

At step 340, a user may pull trailer 100 forward, e.g., by driving forward in the truck or other vehicle to which trailer 100 is secured. Because rear edge of pallet 191 is now in contact with ground 195, the rear edge of pallet 191 catches on ground 195, and the friction or "catch" between the rear edge of pallet 191 and ground 195 causes pallet 191 to slide off trailer bed 110 as trailer 100 is pulled forward. Motor 160 may also be activated to assist pallet 191 in sliding off trailer bed 110, so that push bar 172 pushes pallet 191 toward rear 102 of trailer bed 110 while trailer 100 is being pulled forward. As trailer 100 is pulled forward, and push bar 172 possibly pushes pallet 191 toward rear 102 of trailer bed 110 and ground 195, pallet 192 is eventually completely unloaded from trailer 100 onto the ground.

At step 350, trailer 100 may be pulled forward to clear the area on ground 195 where pallet 191 is located.

Alternatively, prior to unloading pallet 190, at step 360 jack 180 may be activated in the reverse direction, i.e., to level trailer bed 110.

Optionally, at step 370, prior to leveling of trailer bed 110, during leveling of trailer 110, or after leveling of trailer 110, motor 160 may be activated to move chains 120 and 130, and secured push bars 170, 171, and 172, along the top of trailer bed 110 toward front 101 of trailer 100. During this movement, push bar 172 may engage pallet 190 and push pallet 190 toward front 101 of trailer bed 100, thereby allowing for placement of pallet 190 so that trailer 100 is balanced.

At step 380, trailer 100 may be moved to a different location for unloading of pallet 190, which may take place in the same manner that pallet 191 was unloaded.

At step 390, pallet 190 may be unloaded from trailer bed 110 similarly to the unloading of pallet 191.

Although the disclosure herein relates for the most part to unloading of pallets or other cargo, the Trailer Loading/Unloading System as described herein also has benefits for loading. For example, the motor and push bars may be used to position a pallet or cargo on a trailer.

Even though the disclosure herein is directed toward a trailer, it could also be applied to a truck bed, semi-trailer, dry box trailer, or flatbed trailer, or any other trailer with similar characteristics.

The disclosure herein applies analogously to loads other than traditional pallets, but that may have features and/or characteristics similar to pallets and/or palletized loads.

What is claimed is:

1. A trailer, comprising:
   a chassis;
   a cargo bed;
   one or more push bars, wherein each of the one or more push bars is:
      oriented to be substantially perpendicular to the sides of the trailer;
      substantially parallel relative to a bottom of the cargo bed;
      configured to engage and push an object along the cargo bed; and
      secured to a push-bar drive system that is configured to move the push bar along the top of the cargo bed toward the rear of the trailer; and
   an elevating system;
   wherein:
      the push-bar drive system comprises a left drive element and a right drive element;
      each of the one or more push bars is secured on the left end of the push bar to the left drive element and on the right end of the push bar to the right drive element;
      at least one of the left drive element or the right drive element comprises a looping chain, and wherein the looping chain loops around a rear guide shaft and a front guide shaft;
      the left drive element comprises a looping chain that loops around a rear guide shaft and a front guide shaft;
      the right drive element comprises a looping chain that loops around a rear guide shaft and a front guide shaft;
      the looping chain of the left drive element runs above or near the surface of the cargo bed in one direction and beneath the surface of the cargo bed in the other direction; and
      the looping chain of the right drive element runs above or near the surface of the cargo bed in one direction and beneath the surface of the cargo bed in the other direction.

2. The trailer of claim 1, wherein:
   the push-bar drive system further comprises a chain drive motor; and
   the chain drive motor is configured to drive the looping chain of left drive element and the looping chain of the right drive element.

3. The trailer of claim 2, wherein the chain drive motor drives the looping chain of the left drive element and the looping chain of the right drive element by rotating a motor shaft sprocket that turns a motor drive looping chain that turns a front shaft sprocket that is secured to the front guide shaft.

4. The trailer of claim 2, wherein the motor is a winch or drive motor.

* * * * *